United States Patent [19]
Kim

[11] Patent Number: 6,070,075
[45] Date of Patent: May 30, 2000

[54] HARD HANDOFF METHOD USING THE DUMMY PILOT

[75] Inventor: Ik-han Kim, Seoul, Rep. of Korea

[73] Assignee: Samsung Electronics Co., Ltd., Rep. of Korea

[21] Appl. No.: 08/964,145

[22] Filed: Nov. 6, 1997

[30] Foreign Application Priority Data

Jun. 30, 1997 [KR] Rep. of Korea ...................... 97-29574

[51] Int. Cl.[7] ...................................... H04Q 7/20
[52] U.S. Cl. ........................... 455/437; 455/442; 370/331
[58] Field of Search .................... 455/436, 437, 455/442, 525, 438, 439; 370/331, 332, 335, 342

[56] References Cited

U.S. PATENT DOCUMENTS 5,982,759  11/1999  Jo et al. .................................... 370/331

*Primary Examiner*—Nguyen Vo
*Attorney, Agent, or Firm*—Dilworth & Barrese

[57] ABSTRACT

A hard handoff method is provided whereby a mobile station communicates with a base station to execute the handoff over a CDMA channel using only a pilot channel. The method does not require the use of a sync, paging, access, or traffic channel to carry out the handoff procedure. Unlike the conventional handoff in which a base station detects the signal strength of a mobile station continuously and performs a handoff if the signal strength falls below a predetermined threshold, the "Dummy Pilot" method requires the mobile station to provide the base station with handoff information, and the base station performs the handoff in accordance with the provided information.

3 Claims, 2 Drawing Sheets

HARD HANDOFF METHOD USING THE DUMMY PILOT

FIELD OF THE INVENTION

This invention relates to a hard handoff method using the dummy pilot.

More specifically, this invention relates to a hard handoff method that uses not a common frequency but a dummy pilot channel.

DESCRIPTION OF THE RELATED ART

Code Division Multiple Access System consists of many Base Station Transceiver Subsystems to serve mobile stations in fixed area, a Base Station Manager System to manage and control many base station controllers, a Mobile Switching Center and Local Register System.

Each area where a base station serves is called a cell where is separated into several sectors that can he magnified out of a base station area, a BSC area and a MSC area in order.

In the mobile communication system, systems which are under the MSC are called a Base Station Subsystem.

And said BSS is composed of a BSM, a BSC system and a base station system in the same order.

A main processor of the BSC system is called a Call Control Processor and a main processor of the base station system is called a BTS Control Processor.

Also a frequency channel to be formed from the mobile station toward the base station is called a reverse channel and a frequency channel to be formed from the base station toward the mobile station is called a forward channel.

The object of the present invention is to provide that there is no fault in moving of a wireless telephone(a mobile station) in several areas(cells).

Therefore, the mobile station has to reregister for the system periodically while the mobile station is in the idle condition.

When traffic is in action, the mobile station, the base station and the MSC manage communication between the base station and mobile station in order to maintain the good radio link efficiency.

In the CDMA and wide band CDMA technology, it is possible for a system to receive mobile transmission from more than two base stations at the same time and the mobile station can receive transmission of more than two base stations at the same time.

According to the above function, there is provided to treat handoff from one base station to another base station, or from one cell to another cell in a base station.

Handoff is a process by virtue of moving to a new traffic channel, in case that a certain mobile station travels from one base station to another new base station or to a new antenna permitted region in a base station.

In a CDMA cellular or Personal Communication Service system, there are served many kinds of handoff to guarantee the continuity of the traffic.

There may be some differences of efficiency in respects which are a load of system and reliability ol the continuity of the traffic in accordance with the way and the embodiment contents.

The establishment of the channel by this handoff is called ADD, and the cancellation of the channel by handoff is called DROP.

As one known to a person having ordinary skill in the art, there is soft handoff which is a make-before-cut method to make a new traffic before cutting used traffic, and hard handoff which is a cut-before-make method to cut before making a new traffic.

In CDMA system, in case that handoff is needed by virtue of mobility of the mobile station, it is handled preferentially by soft handoff, but due to unavoidable circumstances it is to guarantee the continuity of the traffic by hard handoff.

Soft handoff is a method to guarantee stability of continuity of the traffic according to setting up speech path to several base stations for one traffic simultaneously through the access channel of the same frequency while a mobile station moves between cells.

Because a CDMA system can make simultaneously many speech path by varying codes through a frequency band in a same time period, soft handoff is a peculiar method that can make as many speech path for one traffic.

Quality of traffic can be decided by a speech path to be the best in quality among many speech paths because it is able to make more than two traffic channels at the same time.

According to the above merits, there is provided an increase of whole traffic quality and of continuity of the traffic.

Also in the respect of power control, there is an advantage to be able to minimize the strength of a necessary power.

Since soft handoff can do only in the same frequency or the same frame offset, handoff between cells which in different frequencies cause to happen hard handoff.

More specifically, handoff to be happened in moving between cells in the same base station is called softer handoff.

There is provided hard handoff while the two base stations to have a effect on a mobile station aren't synchronized or aren't in the same frequency, and while there is interruption in speech or data communication.

That is, hard handoff is a method to guarantee continuity of a traffic for the talker by setting a new talking path in short time of being difficult to recognize after cutting the already established speech path.

Therefore, it is impossible to be provided hard handoff when one more frequency bands (frequency assignment or channel) in each cell are used or when two base stations are not synchronized.

There is provided other kinds of hard handoff only when the mobile station is appointed as a analogue cellular channel and there is no CDMA base station to serve effectively other kinds of hard handoff.

It is so important to consider the standard of judgment and decision of the cell to use handoff in hard handoff.

Hard handoff has Inter-MSC hard handoff, Inter Frequency Assignment hard handoff and Inter-Frame Offset hard handoff.

Each cell of a CDMA system has many Frequency Assignment and assigns channels preferentially to frequency assignment to decide by hashing algorithm.

If each frequency assignment is saturated, it is assigned to other frequency to have idle channel.

In the case that a mobile station travels to boundary where is different each other's number of frequency assignment, for example, a mobile station which is served from frequency assignment 2 is moving into a system area to use only frequency assignment 1, the base station accomnplishes handoff as signal strength of the mobile station to be measured in the base station in order to grasp the moving matters.

The base station carries out preferentially hard handoff from present using frequency to first frequency assignment (frequency assignment 1) when the signal strength of the mobile station which is receiving present is below the specially fixed critical point.

The mobile station which completed hard handoff moves to frequency assignment 1 of target cell using soft handoff function in moved frequency.

Because each cell manages first frequency assignment as a common frequency, this method of handoff is called handoff using common frequency.

In said handoff using common frequency, it is provided hard handoff as common frequency while measured signal strength of the mobile station in the base station is under the specially fixed critical point.

Therefore, even though the mobile station is in a center of the area where is put one upon another near cells, there may break out erroneous performance of unnecessary hard handoff because of instability of radio state.

It is possible to occur the matter of traffic cutting because of shortage of channel source of a common frequency if other mobile station is using the common frequency.

In order to prevent the matter of traffic cutting during calling, it is indispensable to reserve the traffic channel for the sake of performing of hard handoff by common frequency in the first stage of traffic establishment.

Also in order to prevent source insufficiency of the common frequency traffic channel by occurrence of hard handoff, the base station relocates the sources, therefore, there is a problem to be able to increase a load of system because of source relocation work.

Accordingly, it is an object of the present invention to provide a hard handoff method using the dummy pilot including over head channel and to get rid of unnecessary handoff in shaded area and unnecessary handoff to secure the traffic channel.

One preferred embodiment of the present invention comprises the steps of:

notifying by BSM to applicable BSC and BS through configuration data that said BS is a dummy pilot BS;

sending by pilot signal on air in accordance with dummy pilot data via BS which have received dummy pilot data;

sending a PS MM to a base station controller through a base station that a mobile station performs an original traffic if the pilot signal strength of a neighboring base station is bigger than T_ADD;

identifying if said neighboring base station is the dummy pilot cell after said BSC analyzes a received PSMM;

sending the HDM to the mobile station after said BSC makes said neighboring base station the target base station, if said neighboring base station is a dummy pilot cell;

forming channel by synchronizing frequency with an indicated frequency via a mobile station to receive a HDM;

transmitting a HCM to a BSC through a base station by mobile station that a channel is formed.

In the present invention, it is preferrable that a hard handoff by a common frequency is carried out, if said neighboring base station is not a dummy pilot cell, it is preferrable that, said message for carrying out said handoff is sent and received through the pilot channel, the sync channel, the paging channel and the access channel.

SUMMARY OF THE INVENTION

In carrying out our invention in one preferred mode, a hard handoff method using the dummy pilot comprising the steps of: notifying by BSM to applicable BSC and BS through configuration data that said BS is a dummy pilot BS; sending by pilot signal on air in accordance with dummy pilot data via BS which have received dummy pilot data; sending a PSMM to a base station controller through a base station that a mobile station performs an original traffic if the pilot signal strength of a neighboring base station is bigger than T_ADD; identifying if said to neighboring base station is the dummy pilot cell after said BSC analyzes a received PSMM; sending the HDM to the mobile station after said BSC makes said neighboring base station the target base station, if said neighboring base station is a dummy pilot cell; forming channel by synchronizing frequency with an indicated frequency via a mobile station to receive a HDM; transmitting a HCM to a BSC through a base station by mobile station that a channel is formed.

BRIEF DESCRIPTION OF THE DRAWINGS

Other objects and advantages of this invention will become apparent upon reading the following detailed description and upon reference to the drawings in which.

Figure 1:
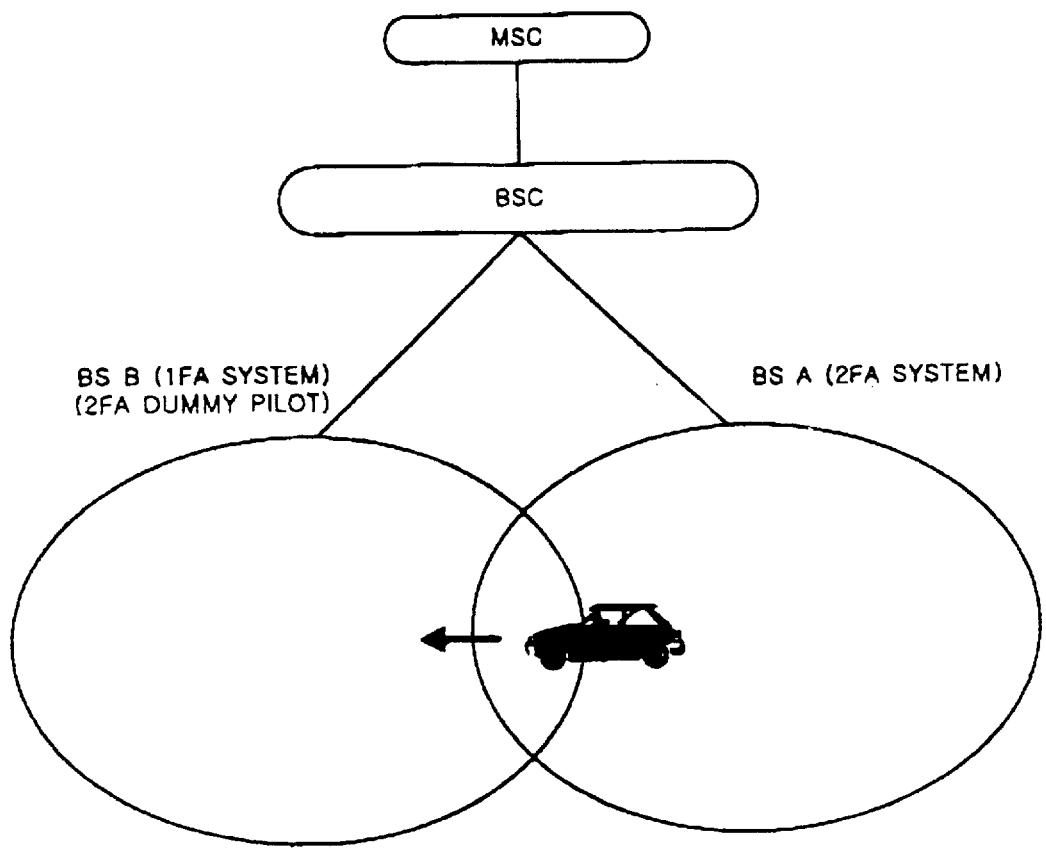
FIG. 1 illustrates a picture of a mobile station which is moving between cells.

While the invention is susceptible to various modifications and alternative forms, specific embodiments thereof have been shown by way of example in the drawings and will herein be described in detail. it should be understood, however, that it is not intended to limit the invention to the particular forms disclosed, but on the country, the intention is to cover all modifications, equivalents, and alternatives falling within the spirit and scope of the invention as defined by the appended claims.

DESCRIPTION OF THE PREFERRED EMBODIMENTS

The invention will be explained, in detail through the drawings and its preferred embodiments.

This invention to achieve above object comprises a stage which sends pilot strength measurement message to a base station controller through a base station that a mobile station does original traffic if pilot signal strength of a near base station is bigger than T_ADD, detected in a mobile station and a stage which a base station controller analyzes received pilot strength measurement message and grasps that a said near base station is the dummy pilot cell; a stage which a base station controller sends a handoff indicate message to a mobile station as a said near base station is a object base station if a near base station is a dummy pilot cell; a stage which a mobile station received a handoff indicate message forms channels by executing frequency synchronization as indicated frequency; a stage which a mobile station transmits a handoff complete message to a base station that channels are formed.

If a mobile station moves to the boundary of the systems which the number of frequency assignment is different, the base station can perform hard handoff using the dummy pilot, as it were, if the mobile station which is using present frequency assignment 2 travels to a base station cell to have one frequency assignment, it is able to carry out while the destination base station uses frequency assignment 2 as the dummy pilot.

FIG. 1 illustrates a picture of a mobile station which is moving between cells.

Referring now to FIG. 1, the mobile station which is calling in frequency assignment 2 in the base station A has one frequency assignment and then moves to B area of the base station which uses frequency assignment 2 as the dummy pilot.

The base station decides if it will be achieved handoff through pilot strength of near stations(base station A, base station B) measured in the mobile station, instead of the pilot strength of the mobile station measured in the base A. In other words, it is preferable to perform hard handoff of the base station while the pilot strength of the near base station is bigger than the specially fixed critical point.

Because the base station B uses frequency assignment 2 as the dummy pilot, the mobile station which is calling with frequency assignment 2 of the base A can receive the pilot signal of the base station B.

The mobile station recognizes to be is moving into the area of the base station 8 through the pilot strength of the measured base station B.

Figure 2:
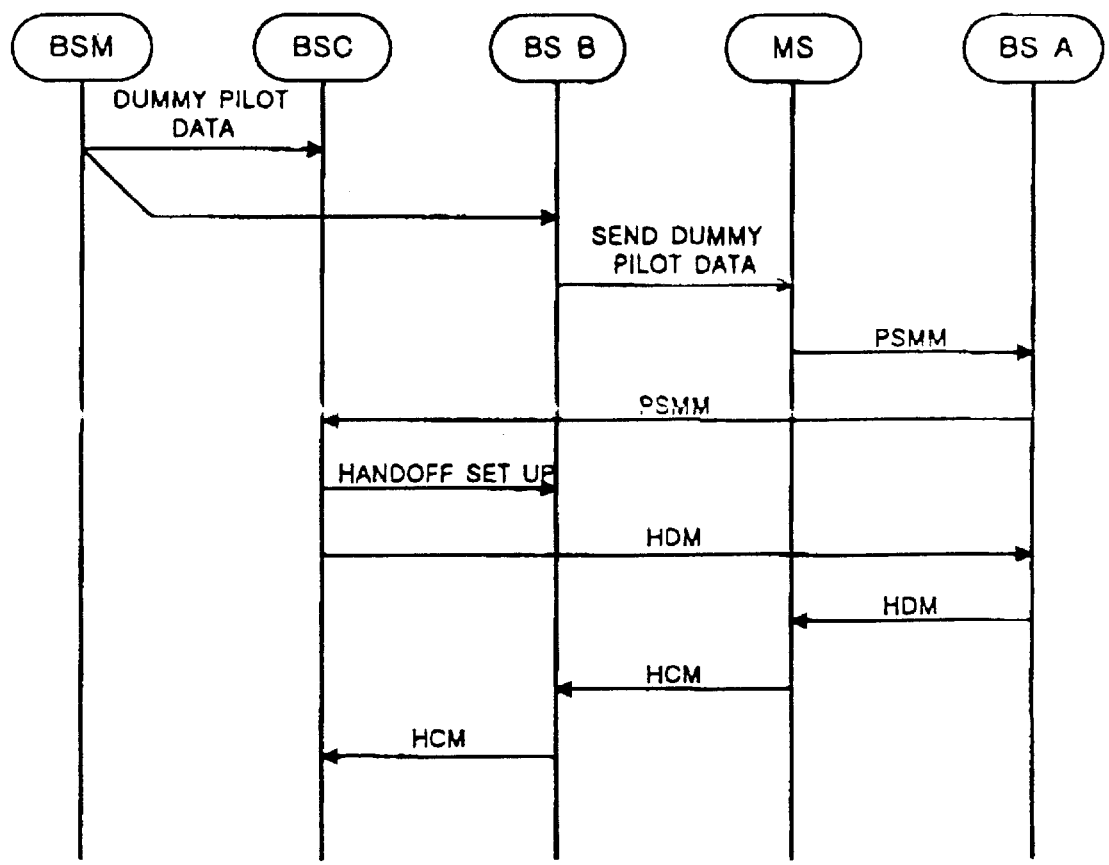
FIG. 2 illustrates a schematic diagram of the operation of hard handoff using the dummy pilot, according to the previous skill.

FIG. 2 illustrates a schematic diagram of the operation of hard handoff using the dummy pilot, according to the related art.

Referring now to FIG. 1, the mobile station which is calling using frequency assignment 2 of the base station A measure the strength of the pilot signal by virtue of pursuing continually the pilot signal of the near base stations.

If the pilot signal strength of the measured base station is more than T_ADD which is handoff performance critical point as a system parameter message of the base station, the mobile station sends the Pilot Strength Measurement Message to the BSC through the present mobile station and the base station which the channel is set up.

The BSC analyzes the PSMM which is transmitted from the mobile station, and then understands the destination cell where the mobile station will move.

If it is confirmed that the format of the destination cell is the cell to use the dummy pilot, the BSC sends the message to make prepare handoff to the base station, the destination.

Simultaneously the mobile station transmits the Handoff Direction Message which makes the mobile station perform hard handoff by the dummy pilot as frequency assignment 1 of the base station B.

If the destination cell doesn't use the dummy pilot, there is preferable to perform hard handoff by a common frequency by the previous skill.

The mobile station to receive the HDM carries out handoff through frequency synchronization of frequency assignment of the base station B which the BSC indicates in accordance with the HDM.

Then the base station sends the Handoff Complete Message which informs that handoff of the base station B is completed through the base station B to be set up, and the BSC recognizes to complete the hard handoff process between frequencies as receiving the HCM.

The hard handoff method using the dummy pilot, there is preferable that the base station can perform hard handoff by transmitting the pilot signal using the only dummy pilot channel.

Therefore, the BSC couldn't recognize if it is necessary that the mobile station need handoff, while the mobile stations which are not calling travel between cells.

So overhead channels, that is, a pilot channel, a sync channel, a paging channel and an access channel, except a traffic channel for data transmission, all provides to perform normally.

Furthermore, the mobile station which is not calling, like moving between normal cells where aren't to use the dummy pilot, can perform handoff in the idle state that the traffic channel is not formed.

In the present invention of said operation, it is preferable that it can increase the probability of the success of hard handoff and decrease the load of system at processing of handoff, by reducing the probability of occurrence of unnecessary hard handoff which is happened in time of using common frequency.

In the present invention, there is provided better service for users as reducing the traffic cutting state, and we got the merit to reduce the load of the system as a resource assignment algorithm of the normal method, not performing the reallocation work of a common frequency.

It is possible to improve whole system performance, as assignment the load of forward direction or reverse direction, by using the overhead channel and it is possible to maintain the balance of frequency assignment.

Finally there is provided the effect to support the probability of the hard handoff success more remarkable than the method to use the normal dummy pilot.

We claim:

1. A hard handoff method using a dummy pilot channel comprising the steps of:

notifying by a base station manager (BSM) to an applicable base station controller (BSC) and base station (BS) through configuration data that said BS is a dummy pilot BS;

sending a pilot signal on air in accordance with dummy pilot data via said BS which has received dummy pilot data;

sending a power signal strength message (PSMM) to the base station controller BSC through the base station BS that a mobile station (MS) will perform a PSMM message transmission if the pilot signal strength of a neighboring base station is greater than a threshold value T_ADD;

determining if said neighboring base station is a dummy pilot cell after said BSC analyzes the received PSMM;

sending a handoff direction message (HDM) to the mobile station after said BSC determines said neighboring base station is a target base station, if said neighboring base station is a dummy pilot cell;

establishing a channel by synchronizing frequency with an indicated frequency via a mobile station to receive the HDM; and transmitting by the mobile station a handoff completion message (HCM) to the BSC through the base station that a channel is established.

2. A hard handoff method using the dummy pilot channel as set forth in claim 1, wherein a hard handoff by a common frequency is carried out, if said neighboring base station is not a dummy pilot cell.

3. A hard handoff method using the dummy pilot channel as set forth in claim 1, wherein said message for carrying out said handoff is sent and received through a pilot channel, a sync channel, a paging channel and an access channel.

* * * * *